United States Patent

Mizuno et al.

Patent Number: 5,205,506
Date of Patent: Apr. 27, 1993

[54] PHOTOGRAPHIC FILM CASSETTE HAVING LIGHT TRAPPING PILE FABRICS ATTACHED TO A MOUTH THEREOF

[75] Inventors: Kazunori Mizuno; Hideaki Kataoka, both of Kanagawa, Japan

[73] Assignee: Fuji Photo Film Co., Ltd., Kanagawa, Japan

[21] Appl. No.: 650,340

[22] Filed: Feb. 4, 1991

[30] Foreign Application Priority Data

Feb. 2, 1990 [JP] Japan ................................. 2-24214
Jun. 18, 1990 [JP] Japan ................................. 2-159342
Oct. 15, 1990 [JP] Japan ................................. 2-277118

[51] Int. Cl.⁵ ................................................ G03B 1/04
[52] U.S. Cl. ................................................ 242/71.1
[58] Field of Search ............... 242/71, 71.1, 71.7, 242/71.8, 71.9, 55.53; 352/72, 75; 354/275, 277; 206/408, 409, 455

[56] References Cited

U.S. PATENT DOCUMENTS

| | | |
|---|---|---|
| 2,336,278 | 12/1943 | Mihalyi . |
| 2,360,255 | 10/1944 | Mihalyi . |
| 2,364,381 | 12/1944 | Mihalyi . |
| 2,521,935 | 9/1950 | Monroe . |
| 2,552,200 | 5/1951 | Mihalyi . |
| 3,467,340 | 9/1969 | Rosenburgh . |
| 3,556,435 | 1/1971 | Wangerin . |
| 3,627,229 | 12/1971 | Wangerin . |
| 3,627,230 | 12/1971 | Wangerin . |
| 3,677,499 | 7/1972 | Wangerin . |
| 3,797,777 | 3/1974 | Hosono et al. . |
| 4,568,590 | 2/1986 | Iwai ........................ 354/277 X |
| 4,730,778 | 3/1988 | Akao et al. ................. 242/71 X |
| 4,787,506 | 11/1988 | Akao ......................... 242/71.1 X |
| 4,832,275 | 5/1989 | Robertson . |
| 4,834,306 | 5/1989 | Robertson et al. . |
| 4,846,418 | 7/1989 | Fairman . |
| 4,848,693 | 7/1989 | Robertson . |
| 4,875,637 | 10/1989 | Beach .......................... 354/275 X |
| 4,880,179 | 11/1989 | Beach ......................... 242/71.1 |
| 4,930,712 | 6/1990 | Smart ......................... 242/71.1 X |
| 4,962,401 | 10/1990 | Takahashi . |
| 5,003,334 | 3/1991 | Pagano et al. . |

FOREIGN PATENT DOCUMENTS

| | | |
|---|---|---|
| 2921379 | 11/1980 | Fed. Rep. of Germany . |
| 37-4453 | 3/1962 | Japan . |
| 37-21388 | 8/1962 | Japan . |
| 51-127737 | 11/1976 | Japan . |
| 53-105222 | 9/1978 | Japan . |
| 57-190947 | 11/1982 | Japan . |
| 61-34526 | 10/1986 | Japan . |

Primary Examiner—Daniel P. Stodola
Assistant Examiner—John P. Darling
Attorney, Agent, or Firm—Sughrue, Mion, Zinn, Macpeak & Seas

[57] ABSTRACT

A film cassette is provided with a film passage mouth to which pile fabrics are attached for trapping light. Pile threads of the pile fabrics are inclined flexibly in the film advancement direction to reduce resistance against film advancement. The leader of the film is formed in a triangular shape such that the film leader end passes the pile fabrics while gradually increasing the contact area with the fabric, thereby reducing resistance against film advancement.

15 Claims, 15 Drawing Sheets

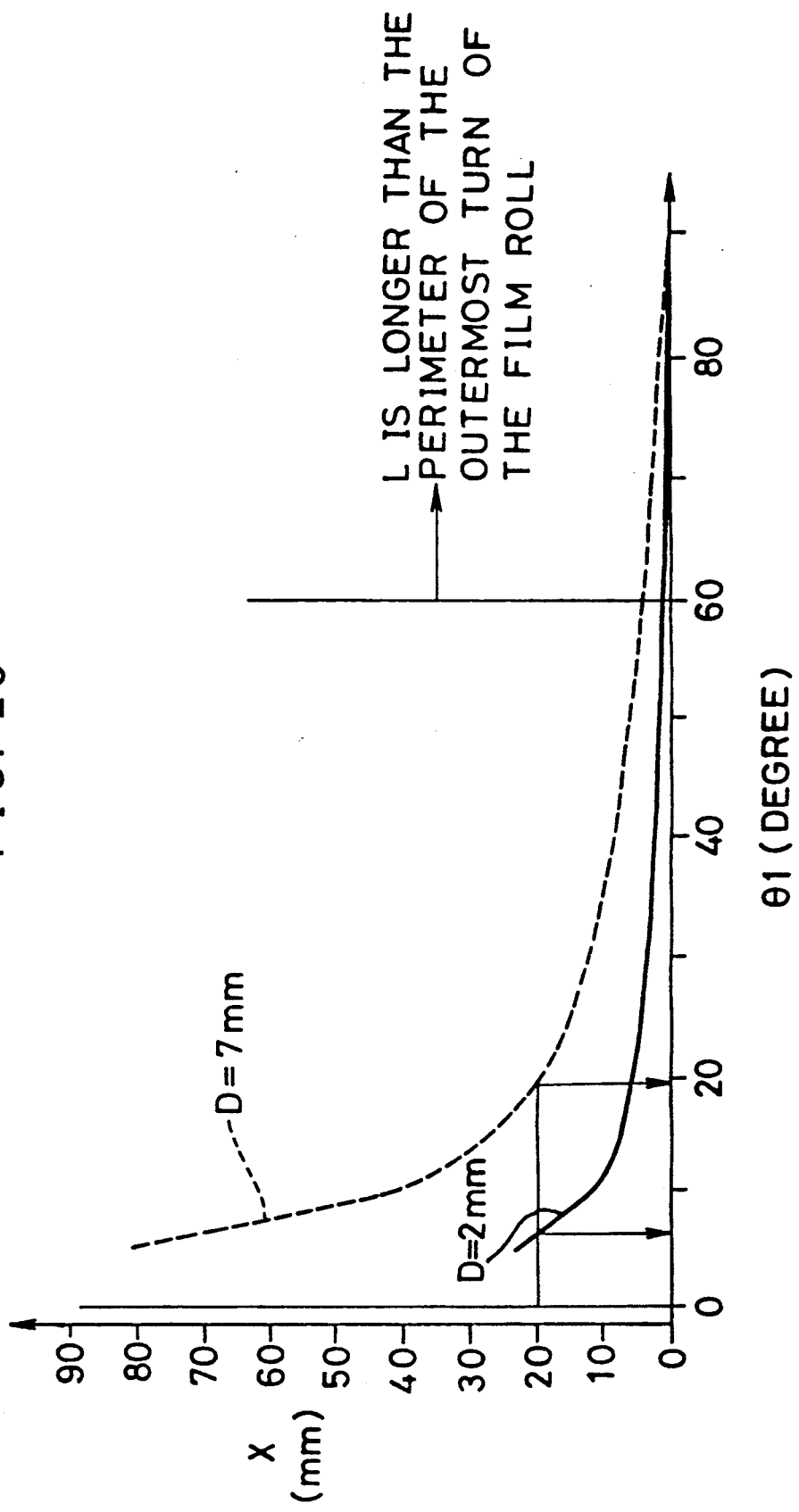

PHOTOGRAPHIC FILM CASSETTE HAVING LIGHT TRAPPING PILE FABRICS ATTACHED TO A MOUTH THEREOF

BACKGROUND OF THE INVENTION

The present invention relates to a photographic film cassette, and more particularly, to an improvement on a light trap fabric which traps light entering the cassette through a film passage mouth.

Presently, a photographic film cassette containing a roll of 135-type (35 mm wide) photographic film is used most widely. This film cassette is constituted by a light-tight cylindrical cassette housing provided with a film passage mouth, a spool rotatably contained in the cassette housing, and a film coiled on the spool. The film leader is maintained in a state in which it protrudes from the film passage mouth. When loading the film cassette into a camera, the film leader is brought into engagement with a threading member of the camera. By driving the threading member, the film is pulled out from the cassette and fed to a film take-up chamber so as to be wound onto a take-up spool in this chamber.

A light trap fabric (commonly called plush) is attached inside the film passage mouth in order to trap light which enters through the film passage mouth into the cassette housing. A number of light trap fabrics are known, including a woven fabric with pile threads as described in Japanese Utility Model Publication No. 37-21388, a knitted fabric with pile threads woven therein as described in Japanese Utility Model Publication No. 61-34526, a fabric made by inlaying pile threads directly in a film passage mouth as disclosed in Japanese Utility Model Publication No. 37-4453 and Japanese Patent Laid-open Publications Nos. 53-105222 and 57-190947, and a non-woven fabric as disclosed in Japanese Utility Model Laid-open Publication No. 51-127737.

If a pile fabric having pile threads is used as a light trap fabric, the directions of pile threads can become disorganized during processes such as dying and brushing. In some cases, pile threads will be inclined in the film rewinding direction, i.e. the inside of the cassette housing. In this case, the light trap fabric will resist the force of film advancement, so that the film cannot be advanced smoothly. Also, the surface of the film may be scratched.

As described in U.S. Pat. Nos. 4,832,275, 4,834,306, 4,848,693, and 4,846,418, and Japanese Patent Laid-open Publications Nos. 1-306844, and 1-306845, a self-advancing film cassette has been proposed in which the film is contained completely within the cassette, and the film leader is advanced to the film passage mouth upon rotation of the spool. With a film cassette of this type, whose film leader is positioned initially within the cassette, if there is a large resistance against film advancement as described above, the film may be bent within the cassette.

SUMMARY OF THE INVENTION

It is a principal object of this invention to provide a photographic film cassette having a light trap fabric which causes little resistance against film advancement.

It is another object of this invention to provide a photographic film cassette capable of advancing a film leader reliably.

These and other objects of this invention are achieved by inclining pile threads of at least one of the two light trap fabrics attached on the upper and lower walls of a film passage mouth, in the direction of film advancement. A woven fabric or a knitted fabric is used as a base for the light trap fabric.

In the case of a warp pile knitted fabric which uses warp threads as pile threads, pile threads are inlaid into the chain threads of the base fabric in the same direction as the chain threads, so that pile threads can be inclined in a predetermined direction relative to the base. For the woven fabric, the base portion of each pile thread perpendicular to the ground fabric is arranged to be no longer than 0.5 mm, each pile thread being inclined, starting from the vertical thread portion, in a predetermined direction relative to the ground fabric. If a woven fabric is used as the light trap fabric, each pile thread intersects with each weft thread and is in contact with all warp threads. It is preferable that the weft thread inlaying density be 50 to 100 lines per inch, or that the number of warp lines be 50 to 100 lines or less per inch.

According to a preferred embodiment of this invention, a film leader end is cut obliquely in substantially a triangular form. In the film leader end triangle, the length of the side in the longitudinal direction of the film is set to be longer than the side in the direction of film width, and shorter than the circumference of the outermost turn of the film roll. This configuration is effective in that the resistance of the film leader imparted by the film passage mouth can be reduced without deteriorating the light trap function.

According to the present invention, pile threads are inclined in the film advancement direction effectively in that the resistance to film advancement can be reduced and the film can be pulled out smoothly. Further, the vertical portion of the pile thread at the base thereof is arranged to have a length of 0.5 mm or less, and the pile thread is inclined in a predetermined direction relative to the base fabric. Therefore, for a self-advancing type film cassette, the film leader can be advanced through the film passage mouth with a small torque. Still further, each pile thread intersects with each weft thread and is in contact with all warp threads. The weft thread inlaying density is set to be 50 to 100 lines per inch or the warp thread inlaying density is set to be 50 to 100 lines per inch. Therefore, the film leader can be stopped reliably at the film passage mouth when the film is rewound within the cassette housing, while retaining a reliable light trap function.

BRIEF DESCRIPTION OF THE DRAWINGS

The foregoing objects and advantages of this invention will become apparent to the person skilled in the art from the following detailed description of the invention when read in conjunction with the accompanying drawings, in which:

FIGS. 20 and 21 illustrate a weaving method of light trap fabrics according to other embodiments of the invention;

FIG. 22 illustrates a weaving method for a fabric according to a comparison example;

FIG. 26 is a graph showing the relationship between the angle of the leader end and the length of the leader end in contact with the light trap fabric.

DETAILED DESCRIPTION OF THE PREFERRED EMBODIMENTS

Figure 1:
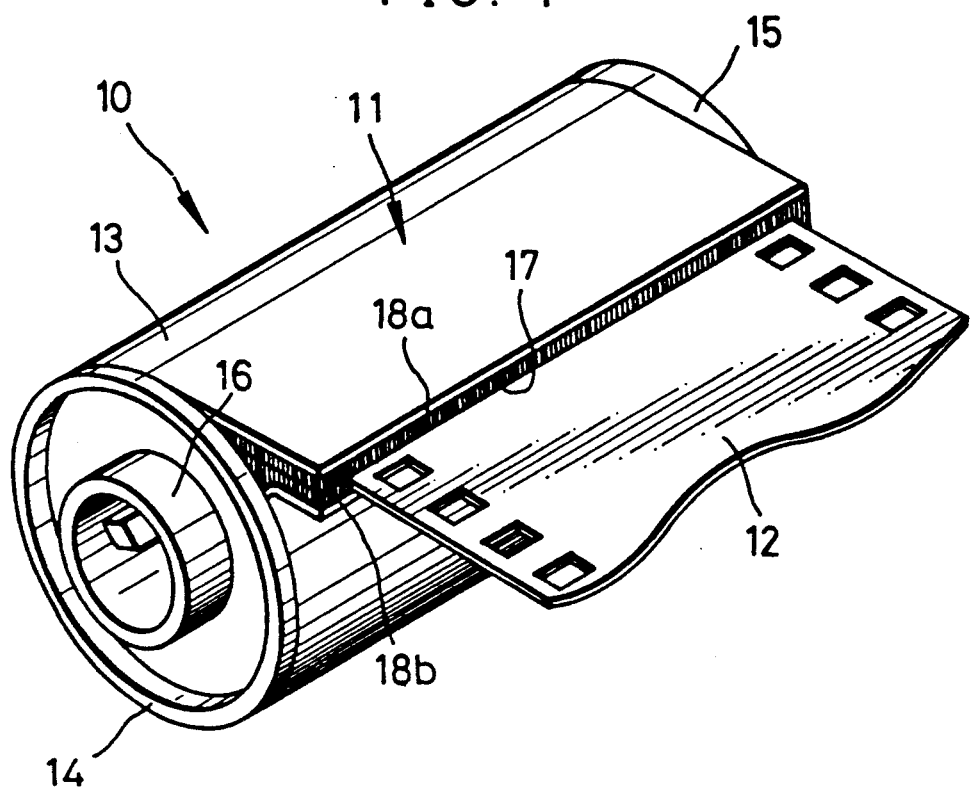
FIG. 1 is a perspective view of an embodiment of a photographic film cassette of this invention.
Figure 2:
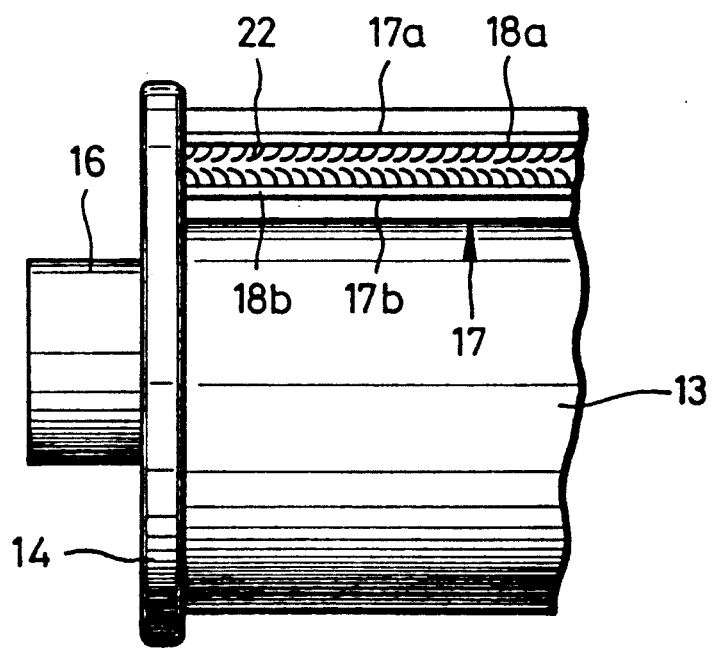
FIG. 2 is a partial front view of the film cassette of FIG. 1, showing the inclined pile threads.
Figure 3:
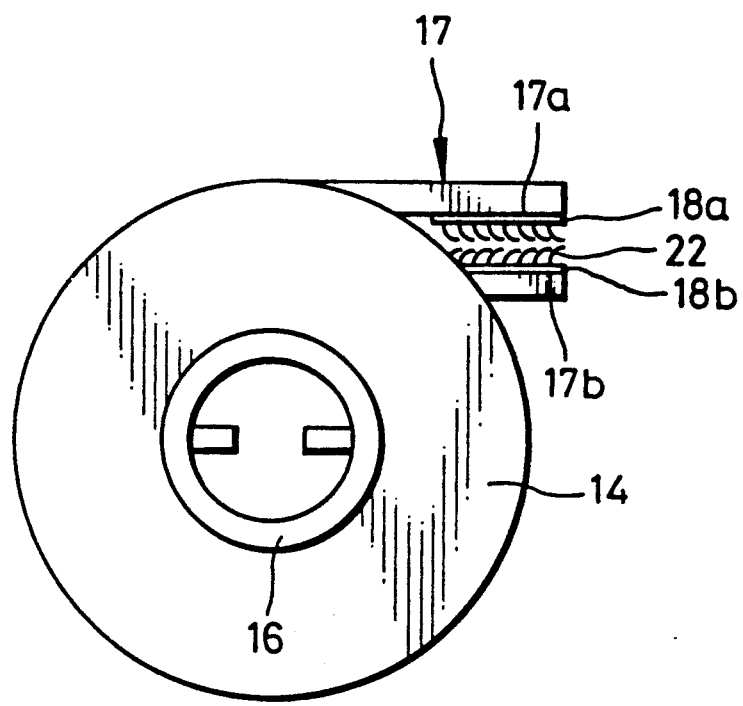
FIG. 3 is a side view of the film cassette of FIG. 1, showing the inclined pile threads.

Referring to FIG. 1, a photographic film cassette 10 is constructed of a cassette 11 and a 135-type film 12 (35 mm wide) contained within the cassette 11. This cassette is constituted by a cylindrical cassette housing 13, a pair of side caps 14 and 15 fitted on opposite sides of the cassette housing 13, and a spool 16 rotatably supported by the side caps 14 and 15. The cassette housing 13 is formed with a film passage mouth 17 through which the film 12 is passed. As shown in FIGS. 2 and 3, light trap fabrics 18a and 18b, which trap light before it enters the cassette housing 13, attached to the upper surface 17a and lower surface 17b of the film passage mouth 17. When the film cassette 10 is no longer used, the leader of the film 12 protrudes out of the film passage mouth 17, and the film 12 is wound on the spool shaft with the trailing end thereof being fixed to the spool 16. The film cassette 10 of this type makes it difficult to advance the film from the film passage mouth 17 even if the spool 16 is rotated.

Figure 4:
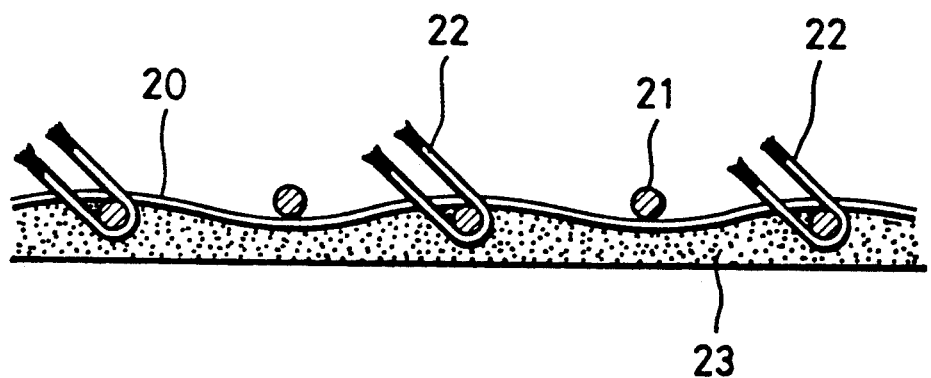
FIG. 4 shows the structure of the light trap fabric shown in FIG. 1.

FIG. 4 shows an embodiment of a light trap fabric constituting an essential part of this invention. A pile woven fabric is used for the light trap fabrics 18a and 18b. Using a double weaving method, upper and lower pile fabrics can be obtained easily at the same time. For example, a base fabric is formed using warp threads 20 of 75 denier rayon and a weft thread 21 of 150 denier rayon. Pile warp threads 22 of 75 denier nylon are woven into the base fabric. Upper and lower pile woven fabrics woven at the same time in the above manner are coupled with common pile threads 22. By cutting the pile threads 22, webs are formed such that the pile threads 22 have fluff cut ends. Although only one warp thread may be used, a plurality of warp threads are used in practice to improve production.

The warp thread 20, weft thread 21, and pile thread 22 may use a polyamide fiber such as various types of nylon, a polyacrylonitrile fiber, a polyester fiber such as polyethylene terephthalate, vinylon fiber, polyvinyl chloride fiber, polyvinylidene chloride fiber, a polyolefine fiber such as polyethylene-polypropylene, a synthetic fiber such as polyethylene-polycarbonate, and a natural and regenerated fiber such as rayon, cupra, acetate, cotton, silk, and wool.

The web is dyed black and brushed to fluff the ends. In general, a brushing roll is disposed in the direction perpendicular to the longitudinal direction of a web. The brushing roll is rotated in the direction opposite to the web transportation direction to make the pile threads 22 rise while brushing them in the longitudinal direction. In this embodiment, the web is brushed such that the pile threads 22 are inclined toward the direction of width of the web by a predetermined angle relative to the longitudinal direction. Specifically, while the web is dried with a tenter type dryer, it is brushed with a wire brush roll (density 200 wires/cm$^2$) inclined by 45° relative to the web transportation direction and rotated in the direction opposite the web transportation direction. As the web is brushed while drying it with the tenter type dryer, pile threads 22 of thermoplastic fiber are deformed thermally, so that the directions of the pile threads are inclined at about 45° relative to the web transportation direction, and are inclined relative to the base fabric.

After the brushing process, the web is slit into a plurality of strips. Next, the strip is cut to obtain light trap fabrics 18a and 18b having the same length as the lateral length of the film passage mouth 17. As shown in FIGS. 3 and 4, the light trap fabrics 18a and 18b are attached to the upper and lower surfaces 17a and 17b of the film passage mouth 17 with adhesive agent 23, with the directions of the pile threads 22 being directed in the film advancement direction. In FIGS. 2 and 3, pile threads 22 are shown less dense than actually is the case, in order to show more clearly the directions of the pile threads.

For the above-described attachment, a mat agent is coated on the lower surface of the light trap fabrics 18a and 18b, and then a hot melt is coated over the mat agent. Then, the light trap fabrics 18a and 18b are placed on the positions at which they are to be attached, for thermal bonding by heat, ultrasound, or high frequency. An adhesive agent containing a mat agent or a double-sided adhesive tape may be used. If the cassette housing 13 is made of plastic, the fabrics may be attached by means of spot welding. Since the upper surface 17a has a longer depth than the lower surface 17b, the width of the light trap fabric 18a is 11.5 mm and that of the light trap fabric 18b is 9.5 mm. One of the light trap fabrics 18a and 18b may use the fabric of this invention with inclined pile threads, and the other may use a conventional fabric.

Figure 5:
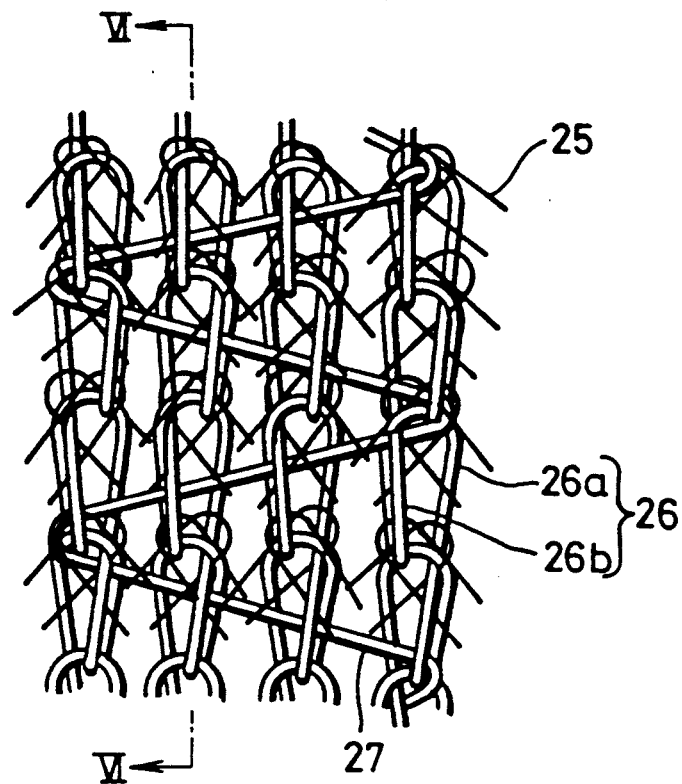
FIG. 5 is a plan view showing the knitted structure of the light trap fabric shown in FIG. 1.
Figure 6:
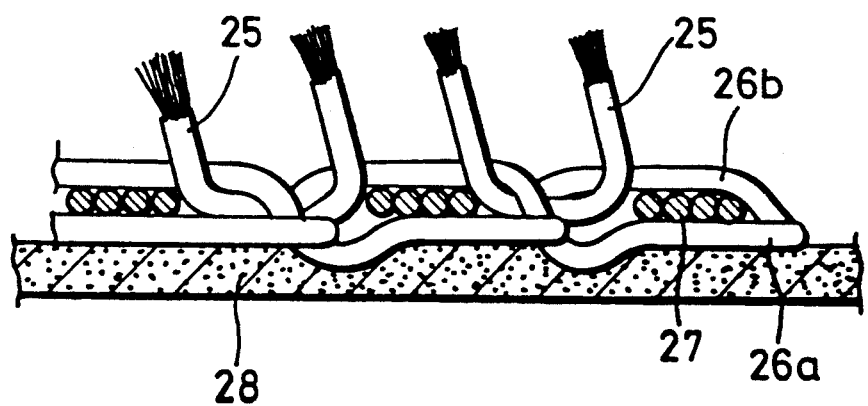
FIG. 6 is a cross section taken along line VI—VI of FIG. 5.

FIGS. 5 and 6 show an embodiment using a pile knitted fabric as the light trap fabric. Two pile knitted fabrics are knitted at the same time using a 22-gauge double raschel machine. Pile threads 25 are inlaid, while they are knitted with chain yarns 26, into the base fabric in the base widthwise direction, and picked up in the same direction. The pile threads 25 thus are protruded in a predetermined direction. After the knitting process, similar to the above embodiment, the dying, brushing, slitting, and cutting processes are carried out to obtain a light trap fabric. Similar to the above-described embodiment, this light trap fabric is attached to the film passage mouth 17, using an adhesive 28, such that the pile threads 25 are directed to the end of the film passage mount 17. Although only one inlaid thread is shown in FIG. 5, four inlaid threads actually are inlaid.

Figure 7:
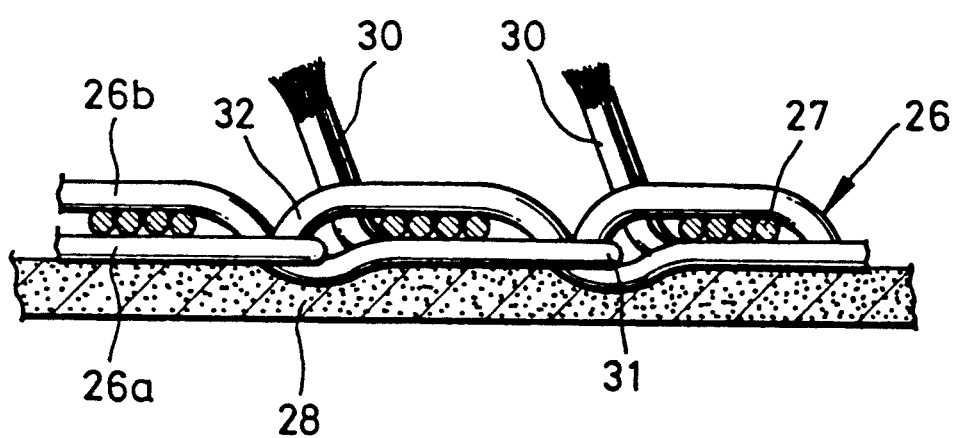
FIG. 7 shows the structure of another embodiment of the light trap fabric.

FIG. 7 shows another embodiment of a light trap fabric. Although the light trap fabric of this embodiment is made by a different pile thread inlaying method, a similar pile knitted fabric, knitted with a 22 gauge double raschel machine, is used. In FIG. 7, elements similar to those of the embodiment shown in FIGS. 5 and 6 are represented by using identical reference numerals. A 30 denier polyester fiber is used as the warp chain yarns 26 and the weft inlaid threads 27, and a 50 denier polyester fiber is used as the pile threads 30. The pile threads 30 are knitted in parallel with the chain yarns 26a at the surface where adhesive agent 28 is coated, so as to form loops with the chain yarns 26 at the needle loop side 31 and erect the pile threads 30 from the knitted fabric at the sinker loop side 32. In this manner, the pile threads 30 are erect, and incline from the knit starting direction to the knit ending direction. Two pile knitted fabrics, which are knitted so as to face each other, are separated by cutting the pile threads 30 coupling the two fabrics. Pile threads 30 are erected by a wire brush while the pile knitted fabric is dried with a tenter type dryer, so as to work the material into a light-tight fabric.

The general type of cassette shown in FIGS. 1 to 3 is of a 135 type which already is used widely. A self-advancing film cassette which advances the film leader to the film passage mouth upon rotation of the spool may have considerable advantages if the light trap fabrics described above are used, while also ensuring the light trap function. This is because the resistance of the light trap fabric of a self-advancing film cassette must be made as small as possible so that the film leader can be projected out of the film passage mouth.

FIGS. 8 to 13 show embodiments of a self-advancing film cassette whose film passage mouth is attached with the light trap fabrics constituting the essential part of this invention. Substantially the same elements shown in FIGS. 8 to 13 are represented by using identical reference numerals.

Figure 8:
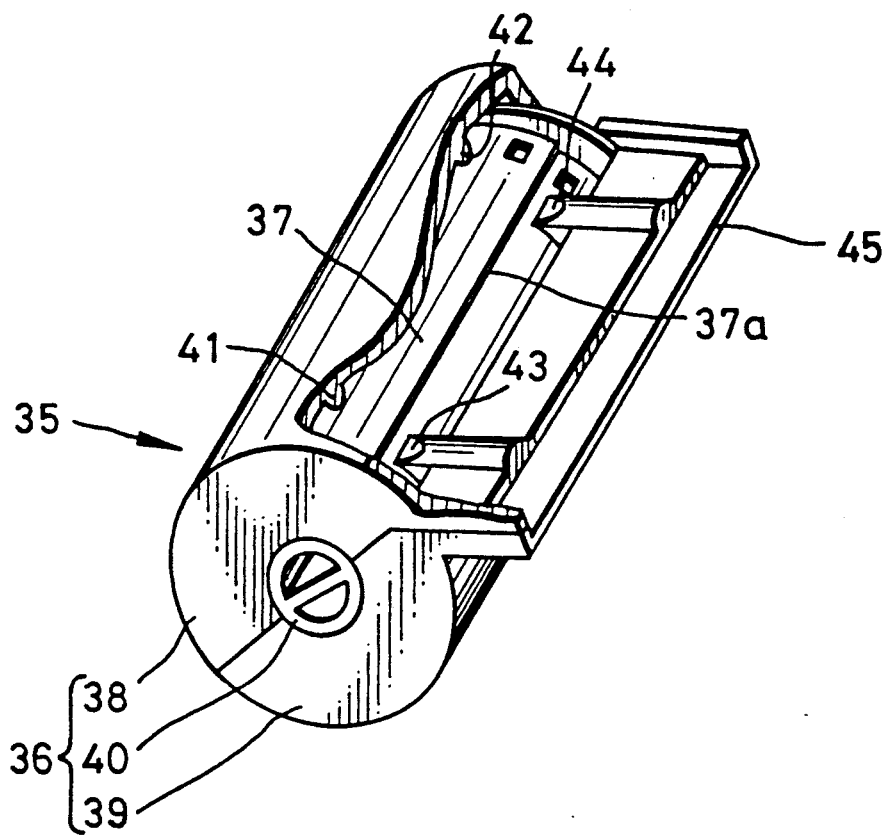
FIG. 8 is a perspective view, partially broken, of a self-advancing film cassette.

In the self-advancing film cassette shown in FIG. 8, a film roll is received by a pair of ring ridges formed on an inner wall of the cassette so that spool rotation can be transmitted reliably to the film roll. The film cassette 35 is constructed of a cassette 36 and a film 37 contained in a coiled shape within the cassette 36. The cassette 36 is constructed of two cassette shell halves 38 and 39, and a spool 40 rotatably mounted within the two cassette shell halves 38 and 39. The two cassette shell halves 38 and 39 are made of plastic, and are joined together to contain the spool 40 with a coiled film. A pair of ridges 41 and 42 are formed on the inner wall of the cassette shell halves 38 and 39 along the circumferential direction thereof. The ridges 41 and 42 come into contact with the outer peripheral surface of the film 37 to prevent the film roll from being loosened. Separation claws 43 and 44 are formed on the ridges 41 and 42 for separating the leader end 37a of the film 37 from the film roll surface. As the spool 40 of this film-advancing cassette 35 is rotated in the unwinding direction, the film roll rotates together with the spool 40. The film leader end 37a is separated from the film roll surface by the separation claws 43 and 44, and is advanced via the film passage mouth 45 out of the cassette 36. The light trap fabric attached to the film passage mouth 45 is not shown in FIG. 8.

Figure 9:
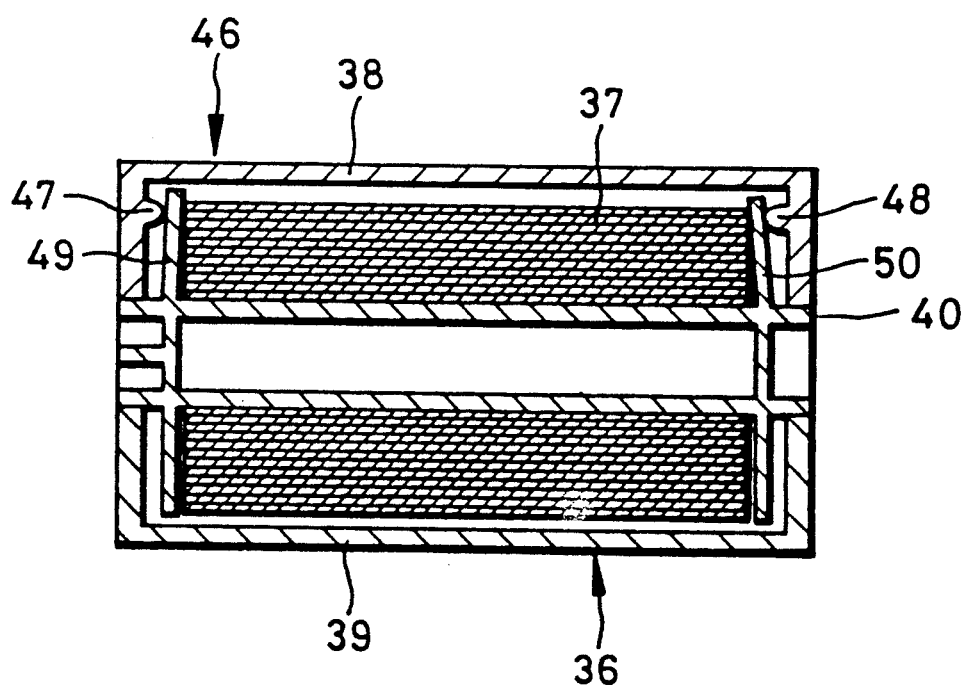
FIGS. 9 to 11 are cross sections of other embodiments of a self-advancing film cassette.

FIG. 9 shows an embodiment of a self-advancing film cassette 46 wherein a film roll is nipped with a pair of flanges of the spool so that spool rotation can be transmitted reliably to the film roll. Two circularly-shaped ridges 47 and 48 are formed integrally on the two side walls of a cassette shell half 38. The ridges 47 and 48 contact the flanges 49 and 50 of the spool 40 to push them inwardly. The inwardly pushed flanges 49 and 50 clamp the film 37 at opposite sides of the outermost peripheral portion of the roll of film 37. Therefore, the rotation of the spool 40 is transmitted directly to the film roll so that the film leader end can protrude out of the cassette.

Figure 10:
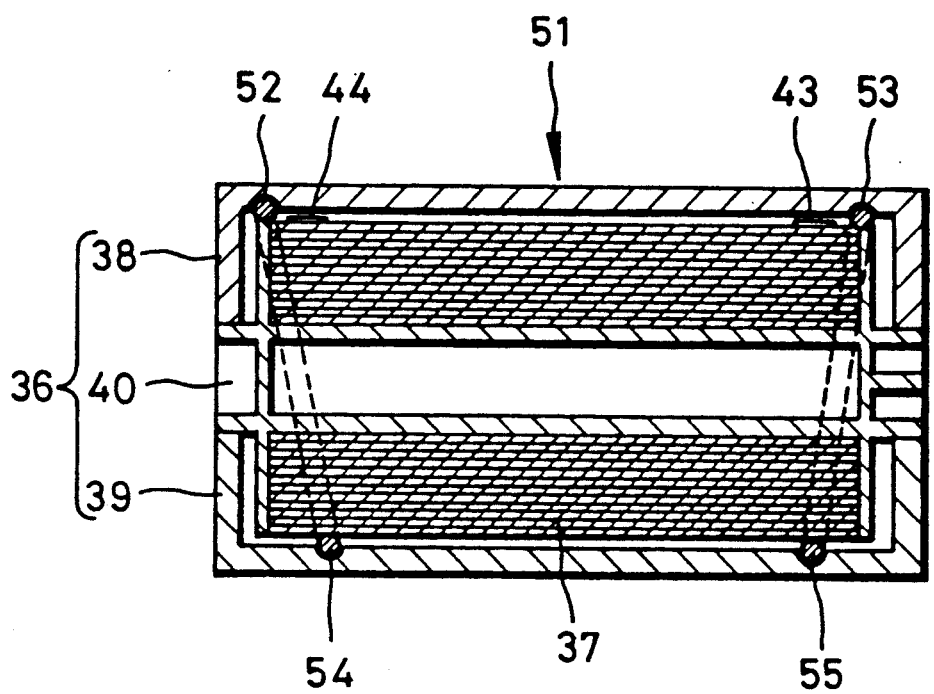

FIG. 10 shows an embodiment of a self-advancing film cassette 51 which includes two rings 54 and 55 for preventing the film roll from being loosened. A pair of grooves 52 and 53 are formed in the inner walls of cassette shell halves 38 and 39, the grooves extending obliquely along the circumference of the inner wall. The rings 54 and 55, which are fitted rotatably within the pair of grooves 52 and 53, contact the outer circumference of the film roll to push it so that it does not become loose. As the spool 40 rotates and the film leader end moves upwardly as viewed in FIG. 10, the film leader end becomes free from the restriction of the rings 54 and 55 because the distance between the rings 54 and 55 is longer than the width of the film 37. As a result, the film leader end is peeled off from the outer circumferential surface of the film roll by the separation claws 43 and 44, and protrudes outside the film passage mouth.

Figure 11:
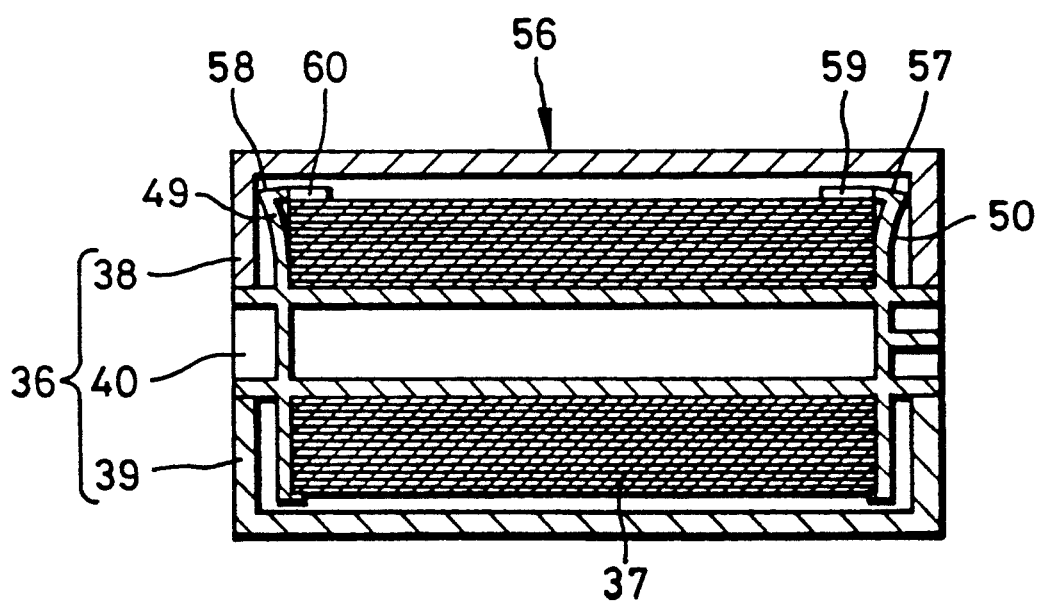

In a self-advancing film cassette 56 shown in FIG. 11, rims 57 and 58 are formed on the outer circumference of a pair of flanges 49 and 50. The rims 57 and 58 receive the film 34 at opposite sides of its outer circumference so as not to allow loosening of the film roll. The rims 57 and 58 contact the side walls of separation claws 59 and 60, and are partially extended outwardly. Therefore, the film roll becomes free from the rims 57 and 58 at a position facing the film passage mouth. Thus, the film leader is peeled off from the film roll surface by the separation claws 59 and 60, and becomes free from the restrictions of the rims 57 and 58, so that the film leader is advanced smoothly out of the film passage mouth.

Figure 12:
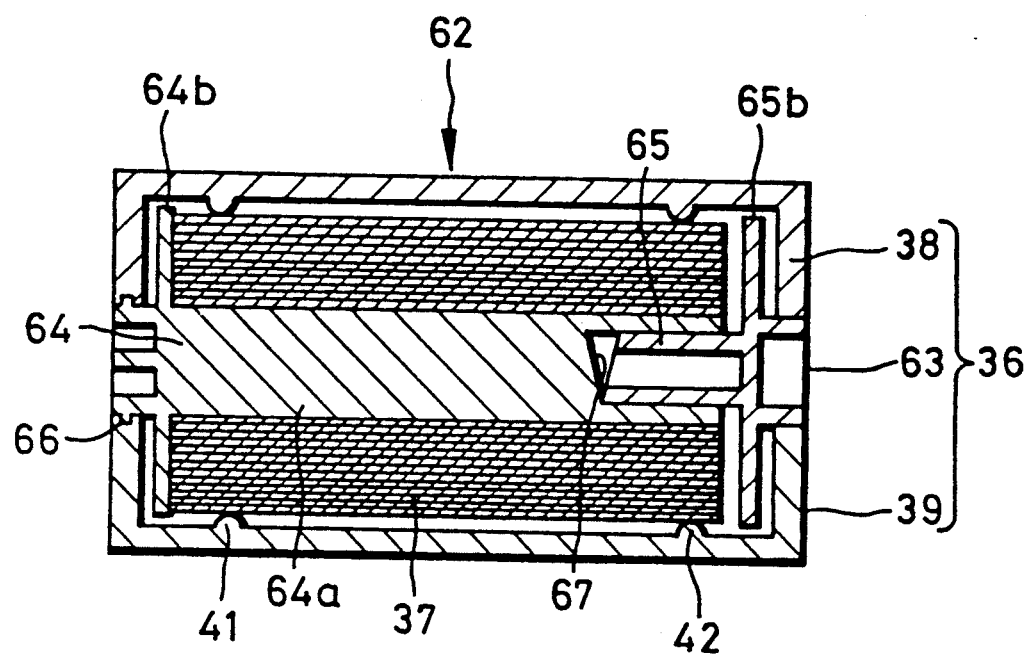
FIG. 12 is a cross section of another embodiment of a self-advancing film cassette with one of the flanges separated from the film roll.
Figure 13:
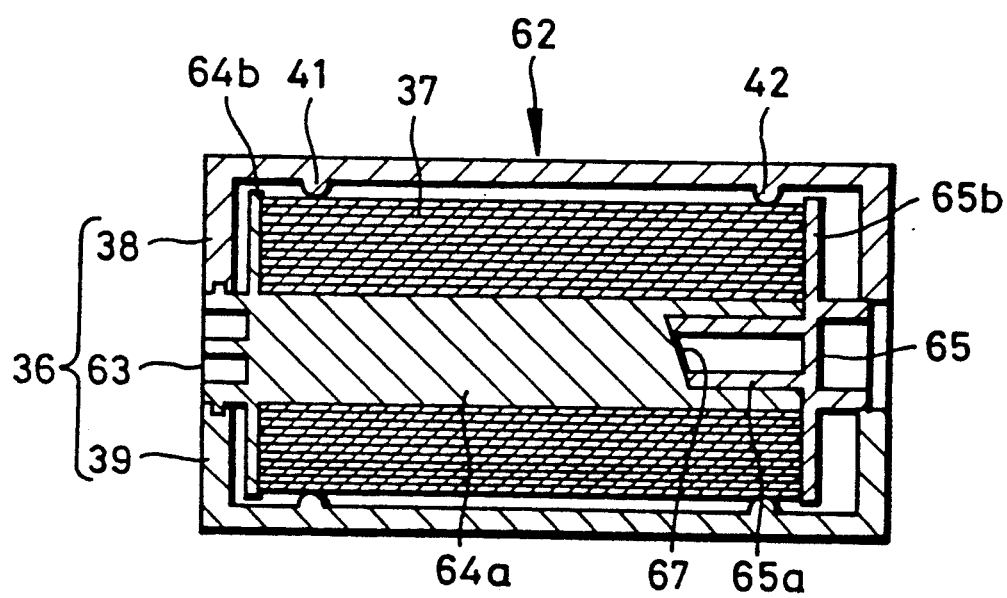
FIG. 13 is a cross section of the embodiment shown in FIG. 12 wherein two flanges clamp the film roll.

In a self-advancing film cassette 62 shown in FIGS. 12 and 13, flanges nip the film roll while it advances, whereas one of them comes apart from the film roll while it is rewound. A spool 63 is constituted by two spool pieces 64 and 65. The shaft 64a of the spool piece 64 is formed with a hole at the end thereof, a shaft 65a of the other spool piece 65 being fitted slidably within the hole. The shaft 64a is formed with a projection 66 at the outer circumference thereof, the projection 66 being fitted rotatably within a groove formed in the bearing aperture wall of the cassette shell halves 38 and 39. The end face of the hole of the shaft 64a is made a slanted surface 67. To achieve a tight contact with this slanted surface 67, the end of the shaft 65a of the spool piece 65 also is made slanted. Flanges 64b and 65b are formed integrally with the spool pieces 64 and 65, respectively, and nip opposite sides of the film roll while it is advanced. Similar to the embodiment shown in FIG. 8, ridges 41 and 42 are formed on the cassette shell halves 38 and 39 to receive the outer circumference of the film roll so as reliably to prevent the roll film from being loosened.

When the spool piece 64 rotates in the unwinding direction, a cam mechanism (not shown) for coupling the spool pieces 64 and 65 operates immediately to move the spool piece 65 toward the spool piece 64, so that, as shown in FIG. 13, the film roll is nipped with the pair of flanges 64b and 65b. Then, both the spool pieces 64 and 65 rotate together, and hence the film roll rotates without being loosened. Thus, the film leader is advanced reliably out of the cassette via the film passage mouth. When the spool 64 rotates to rewind the film, the cam mechanism causes the spool piece 65 to come apart from the spool piece 64, so that the distance between the pair of flanges 64b and 65b becomes wider than the film width, thus enabling a smooth rewinding of the film 37 on the shaft 64a.

The film advancing force was measured for the cases using light trap fabrics according to the invention, and conventional light trap fabrics. Those available in the market were used as the conventional light trap fabrics, which are woven by a similar method as of the embodiment shown in FIG. 2 and whose pile threads were erected substantially vertically. 135 type film cassettes shown in FIG. 1 were used as test samples. Films were wound firmly on spools, and the ends of the spools were fixed by means of tapes to the cassette housings so as to prevent the films from being rewound by their elasticity. They were kept at 50° C. over one night, and thereafter were left at room temperature to remove the tapes. Then, using an Instron tension tester, the advancing forces of these films were measured. The measurement results were as follows: The advancing force for the film cassette using conventional light-tight fabrics was 180 g. The force for the light-tight fabrics shown in FIG. 4 was 120 g. The force for the light-tight fabrics shown in FIGS. 5 and 6 was 85 g. The force for the light-tight fabrics shown in FIG. 7 was 80 g. As seen from the measurement results, the embodiments of this invention have considerably reduced advancing forces as compared with the conventional fabrics, because pile threads 22, 25, and 30 are inclined toward the outlet of the film passage mouth 17.

Figure 14:
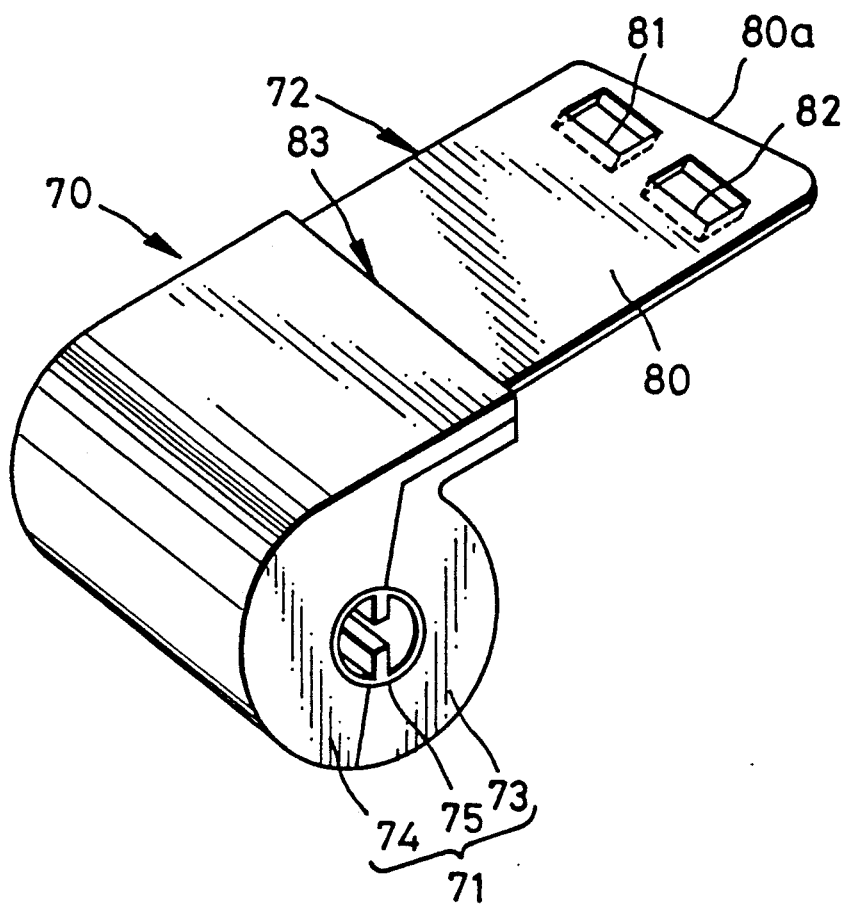
FIG. 14 is a perspective view of a self-advancing film cassette containing a film whose leader is formed with engaging holes.
Figure 15:
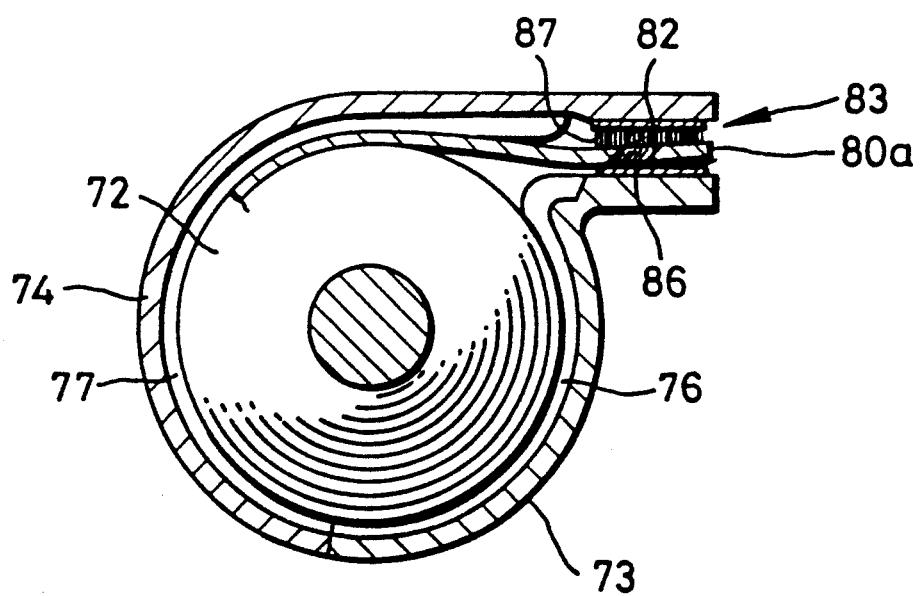
FIG. 15 is a cross section of the film cassette shown in FIG. 14.

FIGS. 14 and 15 show another embodiment of a self-advancing film cassette. The film cassette 70 is constructed of a cassette 71 and a film 72 contained within the cassette 71 in a rolled shape. The cassette 71 is constructed of cassette shell halves 73 and 74, and a spool 75. Similar to the embodiment shown in FIG. 8 or FIG. 11, ridges 76 and 77 having a width of 0.5 mm and a height of 0.6 mm are formed on the cassette shell halves 73 and 74 to prevent the film roll from being loosened. Engaging holes, for example two engaging holes 81 and 82, are formed in the leader 80 of a film 72. The engaging holes 81 and 82 engage pile threads of the light trap fabric 86, obviating a need for separation claws for film advancement. Upon rotating the spool in the winding direction after film exposure, the end 80a of a film leader 80 is stopped by the pile threads within the film passage mouth 83. This construction is advantageous in that the cassette does not need to be broken, even to take out the exposed film to develop it. A pressure member 87 having a light trap function gives supplementary engagement of pile threads with the engaging holes 81 and 82 by pushing the leader end 80a against the light trap fabric 86.

Figure 16:
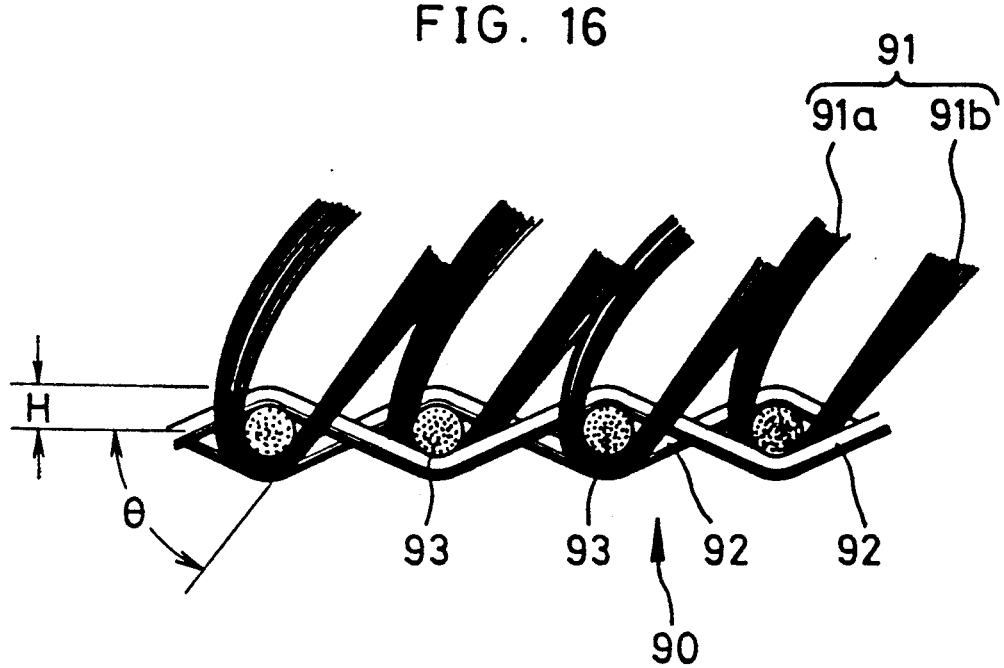
FIG. 16 shows another embodiment of a light trap fabric.
Figure 17:
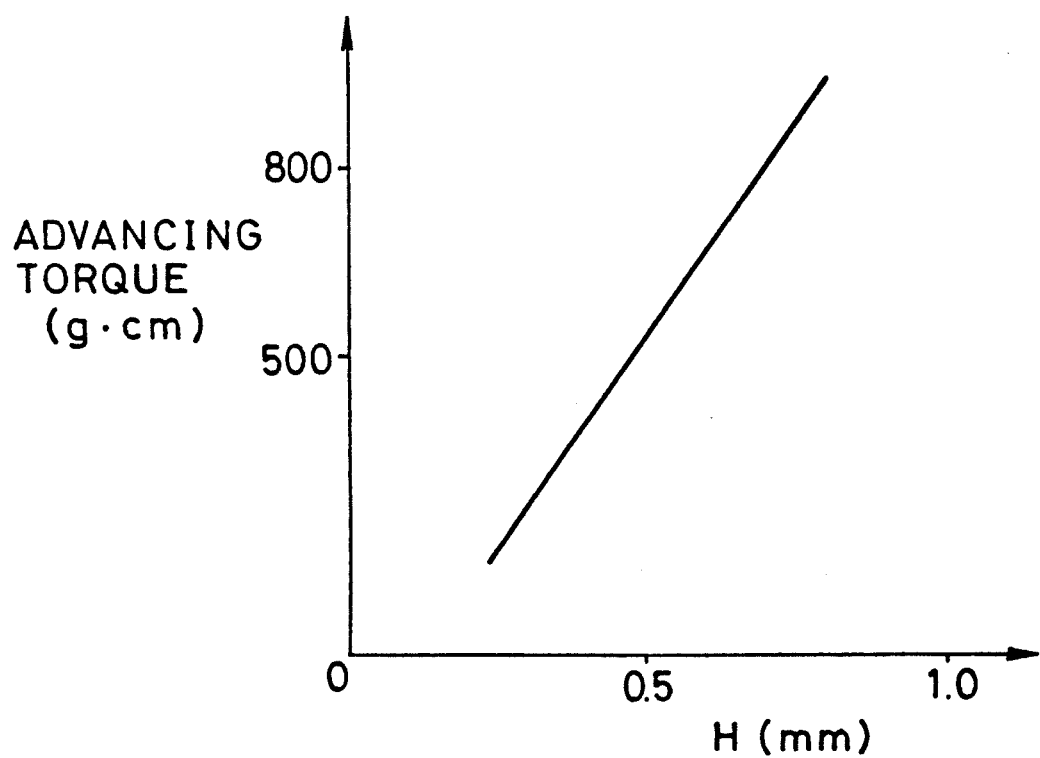
FIG. 17 is a graph showing the relationship between the length H of the base of a pile thread and the advancing torque.
Figure 18:
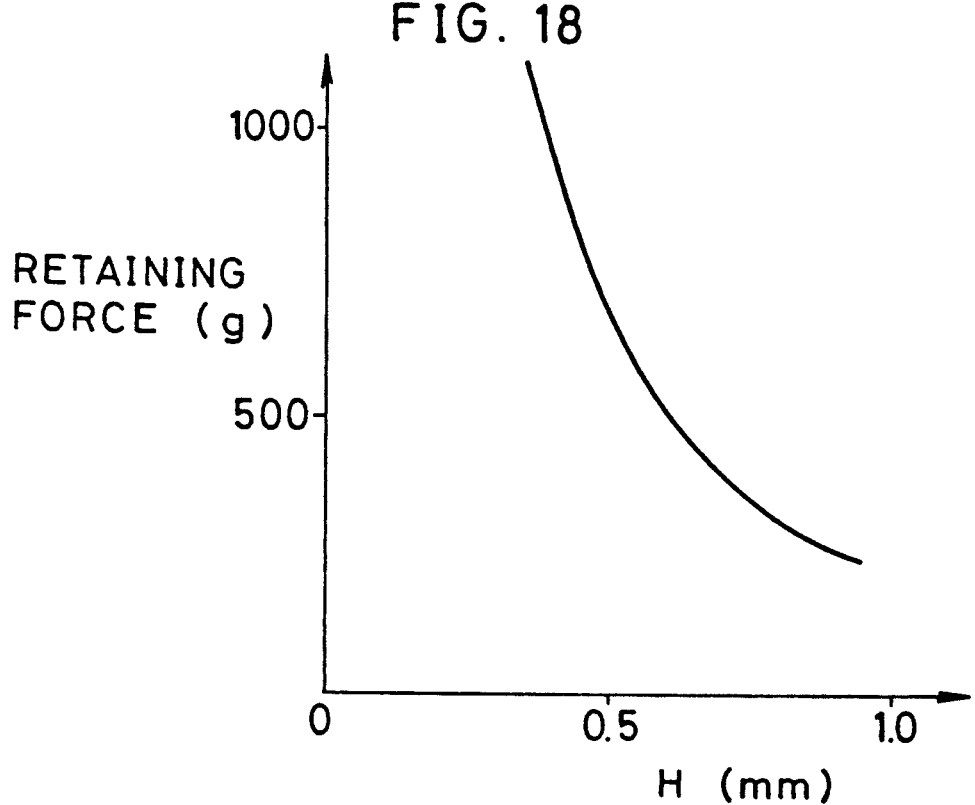
FIG. 18 is a graph showing the relationship between the length H of the base of a pile thread and the film leader retaining force.
Figure 19:
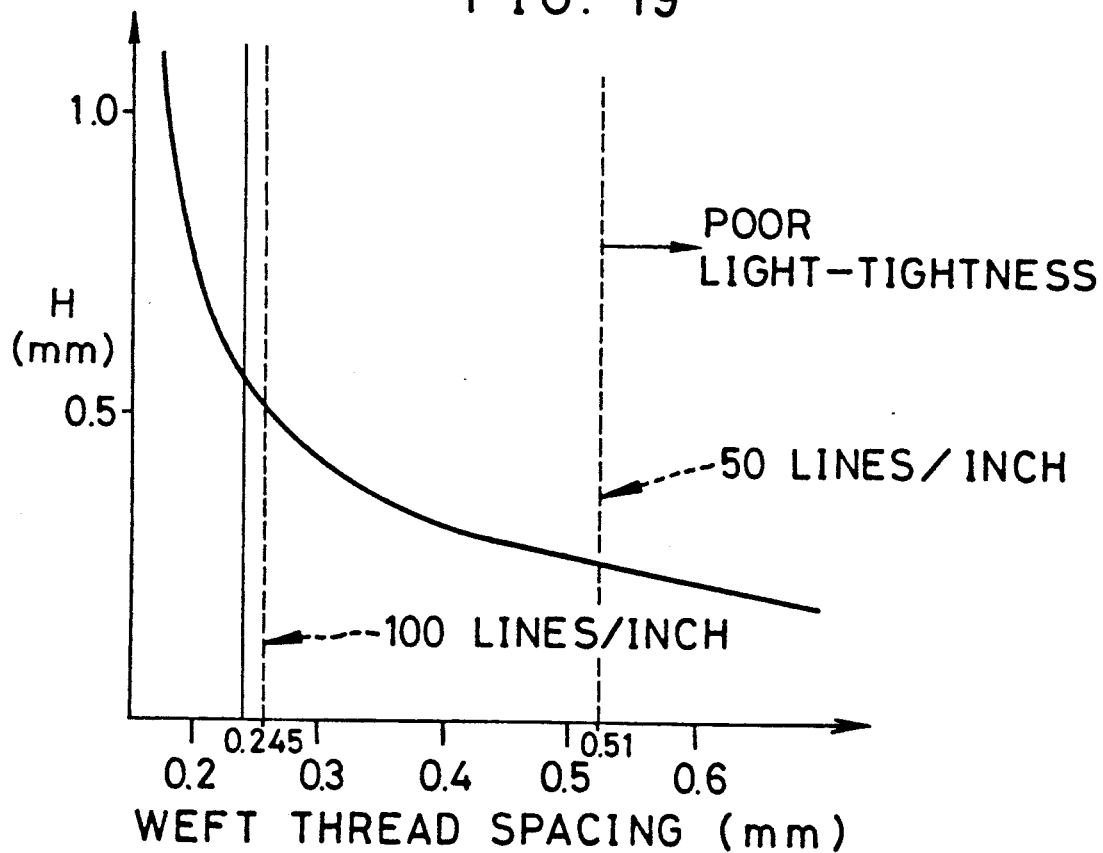
FIG. 19 is a graph showing the relationship between the length H of the base of a pile thread and the spacing between base fabric threads.

FIG. 16 shows a pile woven fabric 90 used as the light trap fabric 86, the fabric 90 including pile threads 91, warp threads 92, and weft threads 93. The base portions of the pile threads 91 go below the weft threads 93 and then rises slantwise at an angle $\Theta$, so that the base portions are substantially vertical. This vertical portion cannot be bent, even when the pile threads 91 are pushed down. The length H of the vertical portion influences greatly the advancing torque for advancing the film leader 80 out of the film passage mouth 83, and the retaining force for retaining the film leader 80 within the film passage mouth 83 as the film 72 is rewound. Specifically, as seen in FIG. 17, the shorter the length H, the more reliably the film leader 80 will be stopped within the film passage mouth 83. This length H changes with the thread spacing between weft threads 93, as shown in FIG. 19, and poor lighttightness will occur when the weft thread spacing exceeds 0.51 mm (weft thread inlaying density is 50 lines per inch or less). Therefore, it is preferable that the length H be 0.5 mm or less and the weft thread inlaying density be from 50 to 100 lines per inch, and more preferably, from 60 to 90 lines per inch.

Figures 20, 21:
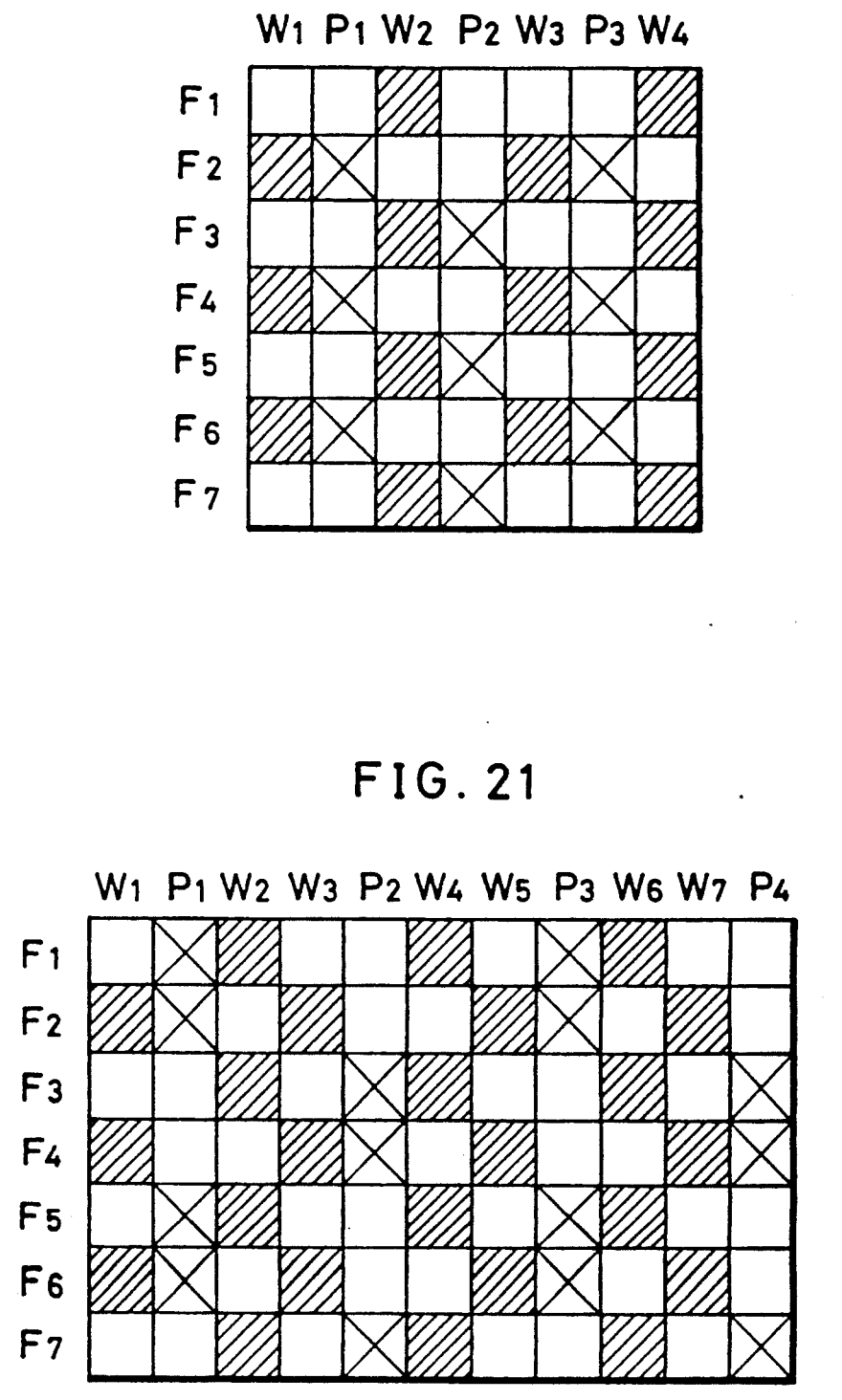

With the foregoing in mind, a pile woven fabric for Example I was woven in the following manner. The base fabric was made by warp threads of rayon of 120 deniers/ 30 filaments and weft threads of rayon of 150 deniers/25 filaments. Pile threads of 66 nylon of 100 deniers/48 filaments were inlaid into the base fabric by using a shuttle weaving machine, thereby obtaining velvet having the structure shown in FIG. 20. The weft thread inlaying density was determined to be 64 lines per inch. In FIG. 20, reference W represents a warp thread, F represents a weft thread, P represents a pile thread, a hatching portion represents the area where the warp thread is above the weft thread, and an X portion represents the area where the pile thread is above the weft thread. By shearing the X portion, pile threads 91a and 91b shown in FIG. 16 can be obtained.

The length of the pile thread extending from the base fabric is about 1.6 mm for a conventional light trap fabric. This length preferably is set to 1.8 mm or longer so that a slanted pile thread leans over an adjacent pile thread, and the film leader retaining force when the film is rewound on the spool can be improved. However, if this length is excessive, the total thickness of the light trap fabric becomes excessive, thereby necessitating a larger inner side dimension of the film passage mouth. In view of the above circumstances, pile threads 91 were cut to a 2.0 mm length by a shearing machine, and dyed into a deep color by a wince dying machine through one-bath/two-step dying by using black direct dye and black acid dye. After dying, the fabric was subjected to sufficient soaping, and was picked up from the wince dying machine to undergo centrifugal extraction. Pile threads of the fabric then were inclined using a drum dryer equipped with a brushing roller, under a thermal drum temperature of 170° C., tensions before and after the thermal drum of 10 kg per 10 cm, and a transportation speed of 4 m/min. More particularly, pile threads of the pile fabric were inclined in the warp thread direction by the brushing roller slightly before the pile fabric was put in the drum dryer, the rotation speed of the thermal drum was set to be slower than the transportation speed of the pile fabric, the pile threads were inclined toward the inlet of the dryer, and the surface from which pile threads extend was brought into contact with the thermal drum. The pile fabric was coated with an acrylic mat agent at the bottom surface thereof to make the light trap fabric. The pile thread inlaying density of the light trap fabrics formed in this manner was 28,000 lines per $cm^2$, and the pile thread layer thickness was 1.65 mm.

A pile woven fabric of Example II was made by the weaving method illustrated in FIG. 21. Cupra of 100 deniers/40 filaments was used as pile threads. The pile woven fabric was dyed into a deep color with black direct dye and the thermal drum temperature was set to 90° C. The other conditions were the same as Example I shown in FIG. 20. The pile inlaying density of this teremp or plush was 26,000 lines per $cm^2$, and the pile thread layer thickness was 1.60 mm.

A pile woven fabric of Example III was made in the following manner. Prior to putting the pile woven fabric into the thermal drum for inclining pile threads as in Example I, the brushing roller was mounted at a 45° angle relative to the transportation direction, and rotated in the direction opposite the transportation direction, with the rotation speed being set about 1.5 times as fast as the transportation speed. In this case, the rotation speed of the thermal drum was set so that its circumferential speed became equal to the transportation speed of the teremp. The other process conditions were the same as Example I.

A pile woven fabric of Example IV was made by inclining pile threads of the pile woven fabric of Example II by the same method as Example III.

Figure 22:
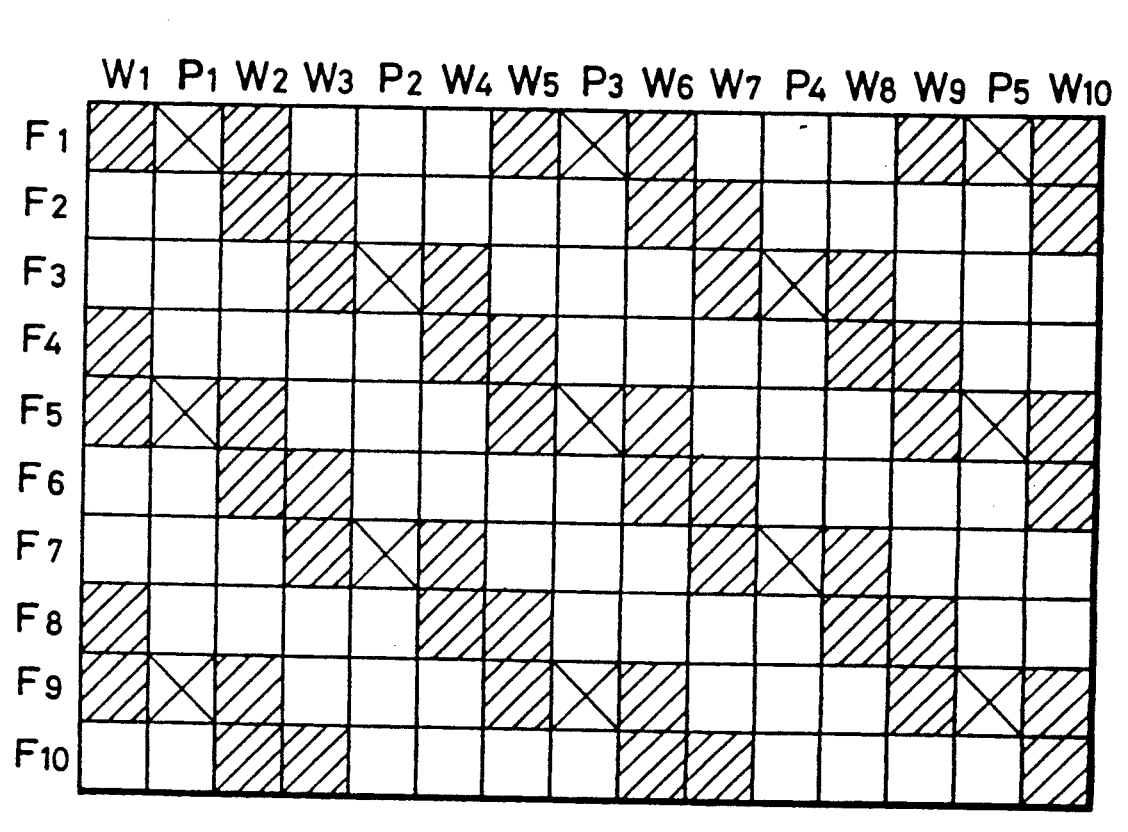

A pile woven fabric of the Comparison Example, having the structure shown in FIG. 22, was made for purposes of comparison with the fabrics of Examples I to IV. This Comparison Example was made at the weft thread inlaying density of 120 lines per inch and at the length of sheared piles of 1.6 mm. The other conditions were the same as Example I.

The pile fabrics made in the above manner were punched out to obtain light trap fabrics having a dimension of 5 mm in width and 40 mm in length, with Examples I and II and Comparison Example being punched lengthwise in the weft direction, and Examples III and IV being punched lengthwise in the warp direction. These light trap fabrics were attached with acrylic adhesive agent having 1.5 mm thickness to each film passage mouth 83 of the cassette 71 shown in FIGS. 14 and 15. The outlet height of the film passage mouth 83 was set to 2.0 mm. Fuji Color Super HG400 films (merchandise name of films manufactured by Fuji Photo Film Co., Ltd.) were used as the film 72, and the film leader ends were cut obliquely at a 60° angle.

For the self-advancing film cassettes using the light trap fabrics of Examples I and IV and the Comparison Example, the torques necessary for film advancement were measured by an advancing torque meter. The measured value used was a maximum value of measured values obtained from starting the spool rotating to extending the film leader end 80a out of the outlet of the film passage mouth 83. The film leader end ratio used herein is a ratio of the number of film cassettes whose film end surely protruded out of the outlet of the film passage mouth upon spool rotation, to the total number of film cassettes used for the measurement (in this case, 50 film cassettes). The width of the engaging holes 81 and 82 was set to 10 mm to measure the torque (engaging torque) while the film leader 80 was pulled in within the film passage mouth. These measurement results are shown in Table 1.

TABLE 1

|  | Ex. I | Ex. II | Ex. III | Ex. IV | Comparison Example |
| --- | --- | --- | --- | --- | --- |
| Advancing Torque (g · cm) | 265 | 230 | 280 | 240 | 850 |
| Leader End Ratio (%) | 100 | 100 | 100 | 100 | 75 |
| Engaging Torque (g · cm) | 1200 | 1050 | 1230 | 1100 | 540 |

As seen from Table 1, Examples I to IV according to the invention all have a small advancing torque, a leader end ratio of 100% which ensures reliable film advancement, and an engaging torque in excess of 1000 g cm which ensures reliable engagement of the film leader end. If a lubricant or the like is applied to the pile thread layer of the light trap fabric, the advancing torque can be further reduced.

Figure 23:
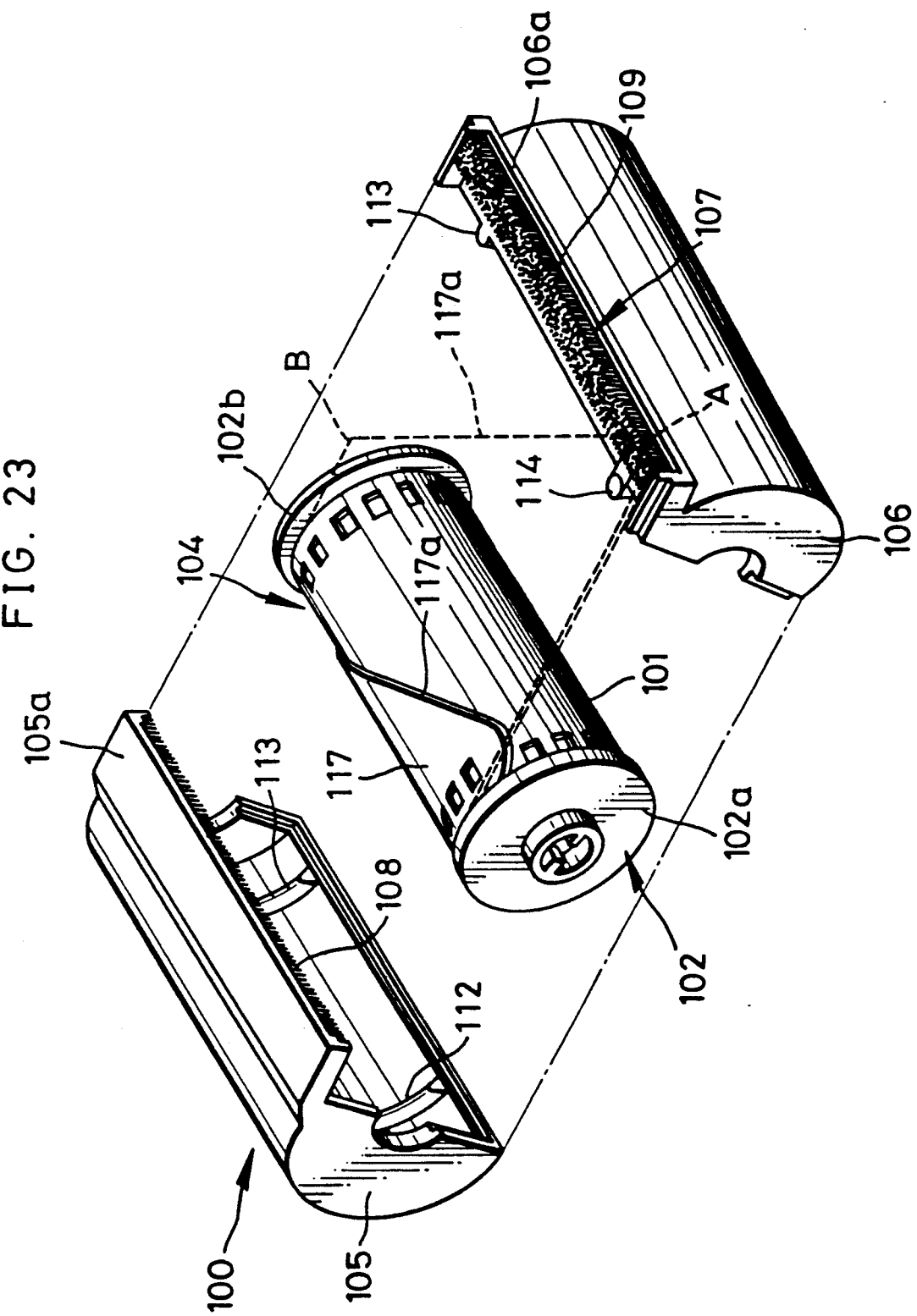
FIG. 23 is a perspective broken view of another embodiment of a self-advancing film cassette.

FIG. 23 shows a self-advancing film cassette 100 having substantially the same structure as that of FIG. 8, and a film 101 whose leader end is cut obliquely. The film 101 is wound on a spool 102 provided with flanges 102a and 102b, so as to form a film roll 104. The spool 102 is contained rotatably within cassette shell halves 105 and 106 which are formed integrally with port portions 105a and 106a to make a film passage mouth 107. Light trap fabrics 108 and 109 made of velvet, for example, are attached to the inner walls of the port portions 105a and 106a. Ridges 112 and 113 are formed on the cassette shell halves 105 and 106. A separation claw 114 is connected to the ridge 112. These ridges 112 and 113 are in contact with the outermost circumference of the film roll 104 at a position slightly inside the perforations.

Figure 24:
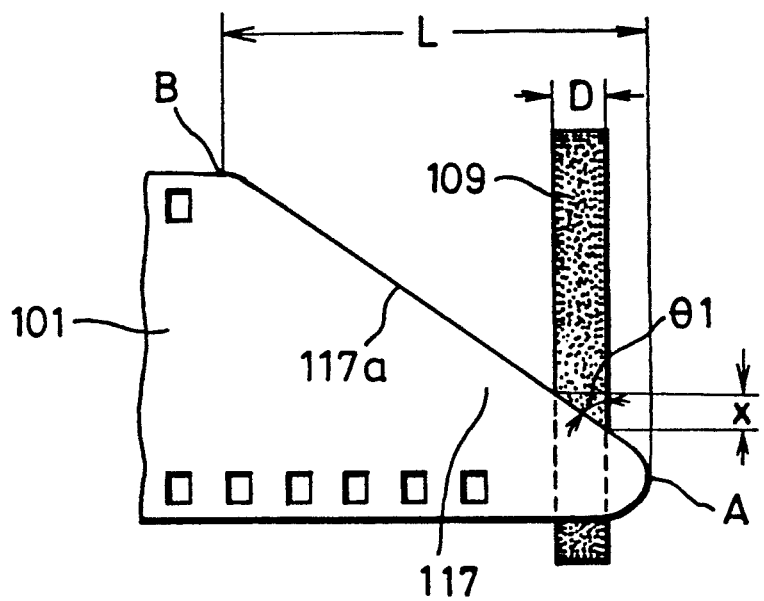
FIG. 24 shows the relationship between the film leader and the light trap fabric shown in FIG. 23.

The end 117a of the film leader 117 is cut obliquely such that the distal end thereof corresponds in position to the separation claw 114, as shown in FIG. 24. If the length L, along the film transportation direction between the distal end A of the leader end 117a and the proximal end B, were to be longer than the circumference of the outermost turn of the film roll 104, the second outermost turn of the film roll 104 would face the film passage mouth 107 so that, if light were to enter from the mouth, the range of the film 101 exposed to light would include the two outermost turns of the film roll 104. On the other hand, if the length L were to be shorter than the width D (e.g., 2 to 7 mm) of the light trap fabrics 108 and 109, the resistance imparted to the film leader 117 while it moves on the light trap fabrics 108 and 109 would become large, thereby increasing the torque necessary for advancing the film leader 117. If the length L were extremely short, sometimes it might be stopped at the midpoint of the film passage mouth. Accordingly, it can be understood that the length L must be longer than the width D and shorter than the circumference of the outermost turn of the film roll 104.

If the spool 102 having the film leader fully wound within the cassette is rotated in the unwinding direction, the film roll 104 rotates with the spool 102 because the film roll 104 is in contact with the ridges 112 and 113 at the outer circumference thereof and is prevented from loosening. When the film leader 117 rotates to the position of the separation claw 114, the distal end A is peeled off from the outer circumference of the film roll 104 by the separation claw 114, and is advanced Via the film passage mouth 107 to the outside of the cassette. As the spool 103 continues to rotate, the film leader end 117 is placed partially on the port portion 106a and advances between the light trap fabrics 108 and 109.

Figure 25:
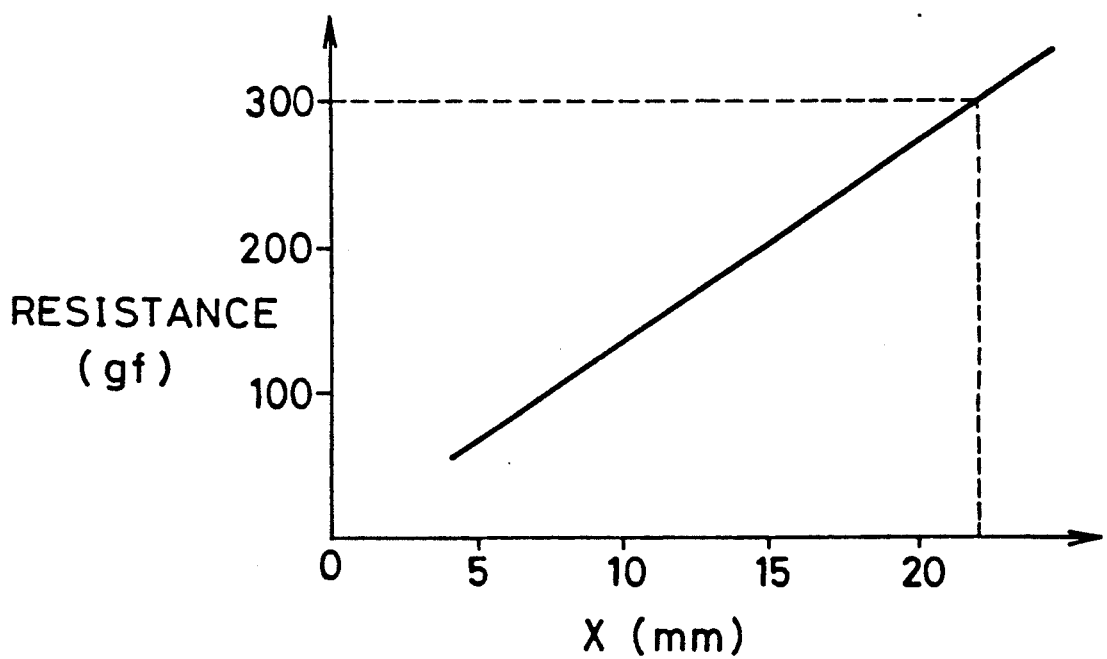
FIG. 25 is a graph showing the relationship between the film leader end resistance and the length of the leader end in contact with the light trap fabric.

The length X, in the direction of film width, of the portion of the leader end 117a which contacts the light trap fabrics 108 and 109 is given by D/tan Θ1, where Θ1 is an inclination angle of the leader end 117a. The resistance imparted by the light trap fabrics 108 and 109 to the film leader 117 changes according to the length X, as shown in FIG. 25. The imparted resistance within the cassette is in the range from 100 to 200 gf. In order to make the film leader 117 pass smoothly out of the cassette, it is necessary to set the spool rotation resistance to be 500 gf or lower at most and, therefore, it is preferable to set the resistance imparted by the light trap fabrics 108 and 109 to be 300 gf or lower. In this case, it is understood from the graph of FIG. 25 that the length X preferably is 20 mm or less. In particular, if the width D is 2 mm, it is preferable that the inclination angle Θ1 be about 5.7° or more, and if the width D is 7 mm, it is preferable that the inclination angle Θ1 be about 20° or more.

If the inner circumferential diameter (corresponding to the outer circumferential diameter of the film roll 104) determined by the inner circumference of the ridges 112 and 113 is 20 mm for example, the length of the circumference of the outermost turn of the film roll 104 is virtually about 60 mm. In such a case, if the length L is longer than 60 mm, the second outermost turn of the film roll 104 faces the film passage mouth 107 so that, if light enters the film passage mouth, the damage to the film roll 104 caused by incident light becomes large. In order to minimize the damage (only the outermost turn), it is necessary to set the length L to be 60 mm or shorter. The film 101 is 35 mm in width, so that tan Θ1=60/35, and thus Θ1 is about 60°. Referring to FIG. 26 showing the relationship between Θ1 and length X, it is preferable that $5.7° \leq \Theta \leq 60°$ for the width of D of 2 mm, and $20° \leq \Theta \leq 60°$ for the width D of 7 mm.

The embodiment with the obliquely cut film leader end may be applied not only to the cassette shown in FIG. 23, but also to the cassettes shown in FIGS. 9 to 15. The base fabric of the pile fabric of this invention may use either a woven fabric with pile threads or a knitted fabric with pile threads. Thus, in addition to the above-described velvet woven fabric and double raschel knitted fabric, other fabrics such as tricot knitted fabric also may be used. The pile fabric of this invention is applicable not only to a film cassette for a photographic camera, but also to a casing for containing various types of strip photosensitive materials such as color photographic paper, computerized phototypesetting film, light-sensitive resin film, and microfilm.

While the invention has been described in detail above with reference to preferred embodiments, various changes and modifications within the scope and spirit of the invention will be apparent to people of working skill in this technological field. Thus, the invention should be considered as limited only by the scope of the appended claims.

What is claimed is:

1. A film cassette comprising:
   a cassette formed with a film passage mouth for allowing a film to pass therethrough, said film passage mouth having upper and lower surfaces; and
   light trap fabric attached to said upper and lower surfaces, wherein each of said light trap fabrics comprises pile threads, said pile threads of at least one of said light trap fabrics being inclined in a direction of advancement of the film from said cassette,
   wherein said light trap fabric comprises a warp knitted fabric having said pile threads, said pile threads being knitted in a base fabric of said pile knitted fabric, and
   further wherein said pile threads protrude from said base fabric, with said inclination being along a direction from a needle loop toward a sinker loop of said base fabric.

2. A film cassette according to claim 1, wherein said pile threads are inclined by approximately 45° relative to said direction of advancement of said film.

3. A film cassette according to claim 2, wherein said cassette comprises a self-advancing film cassette having a cassette housing, and a spool rotatably contained in said cassette housing and having said film in a coiled state, wherein, when said spool is rotated in an unwinding direction, a leader of said film is advanced from said cassette via said film passage mouth.

4. A film cassette according to claim 3, wherein said film leader is cut obliquely in a substantially triangular shape, and side of said triangular shape in a longitudinal direction of said film is longer than a side of said triangular shape in a widthwise direction of said film and shorter than a circumference of an outermost turn of said coiled film.

5. A film cassette according to claim 1, wherein said warp knitted fabric comprises fabric knitted in a double raschel machine.

6. A film cassette according to claim 5, wherein said cassette comprises a self-advancing film cassette having a cassette housing, and a spool rotatably contained in said cassette housing and having said film in a coiled state, wherein, when said spool is rotated in an unwinding direction, a leader of said film is advanced from said cassette via said film passage mouth.

7. A film cassette according to claim 6, wherein said film leader is cut obliquely in a substantially triangular shape, and a side of said triangular shape in a longitudinal direction of said film is longer than a side of said triangular shape in a widthwise direction of said film and shorter than a circumference of an outermost turn of said coiled film.

8. A film cassette according to claim 1, wherein said cassette comprises a self-advancing film cassette having a cassette housing, and a spool rotatably contained in said cassette housing and having said film in a coiled state, wherein, when said spool is rotated in an unwinding direction, a leader of said film is advanced from said cassette via said film passage mouth.

9. A film cassette according to claim 8, wherein said film leader is cut obliquely in a substantially triangular shape, and side of said triangular shape in a longitudinal direction of said film is longer than a side of said triangular shape in a widthwise direction of said film and shorter than a circumference of an outermost turn of said coiled film.

10. A film cassette comprising:

a cassette formed with a film passage mouth for allowing a film to pass therethrough, said film passage mouth having upper and lower surfaces; and light trap fabric attached to said upper and lower surfaces, wherein each of said light trap fabrics comprises pile threads, said pile threads of at least one of said light trap fabrics being inclined in a direction of advancement of the film from said cassette, wherein said light trap fabric comprises a woven fabric having pile thread woven of warp and weft threads, all of said weft threads of said woven fabric intersecting with each of said pile threads, and each of said pile threads being in contact with an adjacent one of said warp threads and, further wherein a length of a base portion of said pile threads substantially perpendicular to a base fabric of said woven fabric is determined to be no longer than 0.5 mm.

11. A film cassette according to claim 10, wherein an inlaying pitch of one of said weft threads and said warp threads is 50 to 100 threads per inch.

12. A film cassette according to claim 10, wherein said cassette comprises a self-advancing film cassette having a cassette housing, and a spool rotatably contained in said cassette housing and having said film in a coiled state, wherein, when said spool is rotated in an unwinding direction, a leader of said film is advanced from said cassette via said film passage mouth.

13. A film cassette according to claim 12, wherein said film leader is cut obliquely in a substantially triangular shape, and side of said triangular shape in a longitudinal direction of said film is longer than a side of said triangular shape in a widthwise direction of said film and shorter than a circumference of an outermost turn of said coiled film.

14. A film cassette according to claim 10, wherein said cassette comprises a self-advancing film cassette having a cassette housing, and a spool rotatably contained in said cassette housing and having said film in a coiled state, wherein, when said spool is rotated in an unwinding direction, a leader of said film is advanced from said cassette via said film passage mouth.

15. A film cassette according to claim 14, wherein said film leader is cut obliquely in a substantially triangular shape, and side of said triangular shape in a longitudinal direction of said film is longer than a side of said triangular shape in a widthwise direction of said film and shorter than a circumference of an outermost turn of said coiled film.

* * * * *